May 2, 1933.  A. BOLTON  1,906,522

AUTOMATIC FRICTION CLUTCH

Filed Jan. 15, 1932

Inventor
ARTHUR BOLTON,
BY
Toulmin & Toulmin
Attorneys

Patented May 2, 1933

1,906,522

UNITED STATES PATENT OFFICE

ARTHUR BOLTON, OF GATESHEAD, ENGLAND

AUTOMATIC FRICTION CLUTCH

Application filed January 15, 1932, Serial No. 586,726, and in Great Britain March 26, 1931.

This invention relates to automatic friction clutches of the kind providing a proportional drive through a nut floating on a threaded shaft.

The object of the present invention is to provide improved means for controlling the movement of the floating nut to enable the clutch to be locked when disengaged or when engaged or allowed to become automatically engaged and disengaged under the action of its thread according to whether the driven member overruns or lags behind the driving member. A further object of the invention is to provide a small compact clutch and controlling means very suitable for fitting to the gear wheels in a change-speed gear box, for example, the gear box of an automobile, so that the several pairs of gears may remain constantly in mesh, thus providing an easily-manipulated self-changing silent gear box of relatively few parts.

Control means in accordance with my invention comprise a movable key interposed between the threaded shaft and the floating nut, said key having a projecting portion coacting with a keyway in the nut so that movement of the key travels the nut on its thread. Conveniently the key may slide axially in the shaft and its projecting portion may be oblique and engage an inclined keyway in the nut.

Figure 1:
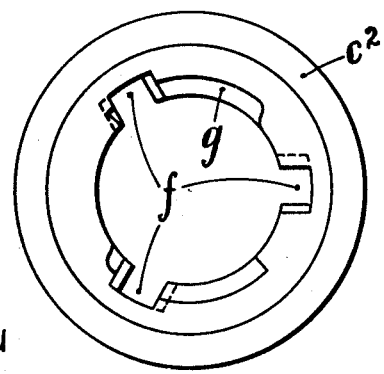
Figure 2:
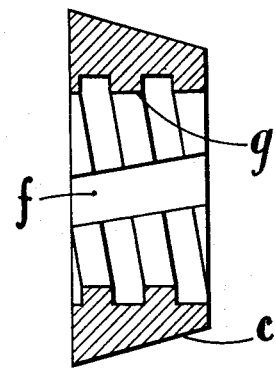
Figure 3:
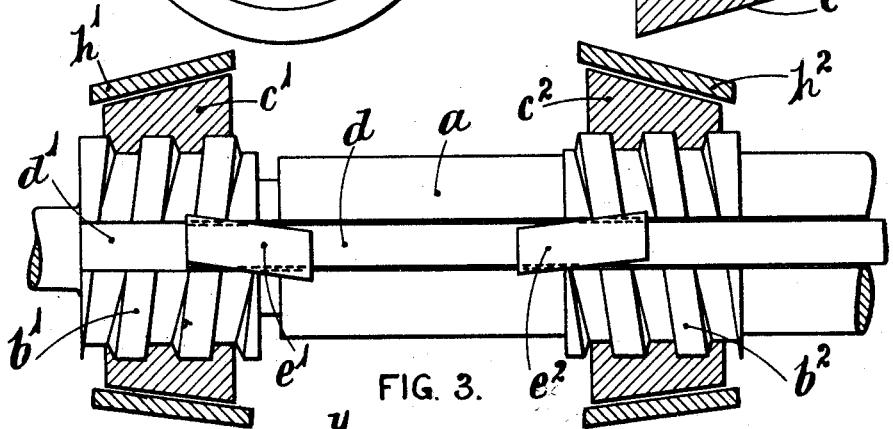
Figure 4:
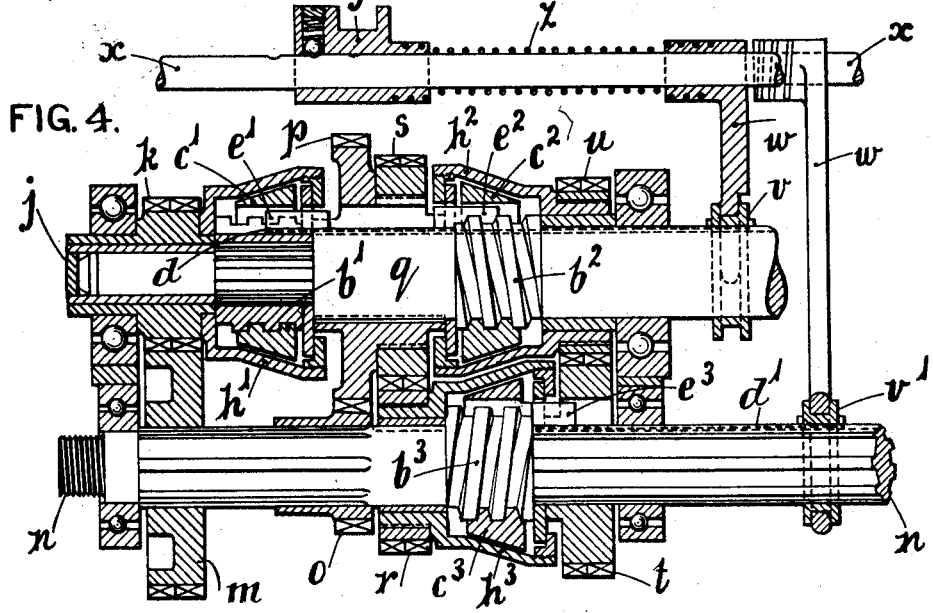

In the accompanying drawing, Figure 1 is an end elevation of a clutch nut, Figure 2 is a vertical section thereof, and Figure 3 is an elevation of a threaded shaft fitted with two clutches (in section), and with a sliding key in accordance with my invention. Figure 4 is a vertical section of a gear box illustrating the application thereto of three clutches fitted with my improved controlling means.

Referring to Figs. 1, 2 and 3, $a$ is a shaft provided with opposite threads $b^1$, $b^2$ on which ride internally-threaded conical clutch nuts $c^1$, $c^2$. $d$ is the sliding key which is interposed between the shaft and the nuts. The key is sunk in a keyway $d^1$ in the shaft $a$ and cuts through the threads $b^1$, $b^2$. The key is adapted to slide parallel to the axis of the shaft and is provided with two opposite-inclined oblique projecting portions $e^1$, $e^2$ which fit loosely into oblique keyways $f$ cut in the floating nuts $c^1$, $c^2$. Conveniently the oblique portions $e^1$, $e^2$ of the key are at right-angles to the threads $b^1$, $b^2$, and the keyways $f$ in the nuts are at right-angles to their internal threads $g$. In the example illustrated, there are three equidistantly spaced keyways $f$ in each nut as shown in Fig. 1, the shaft $a$ being provided with three keys to correspond, but the number of keys may be varied as desired.

It will be seen that, if the key (or keys) $d$ is slidden to the left, its oblique portion $e^1$ coacting with the corresponding keyway $f$ in the nut $c^1$ will partially revolve the nut and cause it to travel on its thread $b^1$ so that its coned periphery is moved into engagement with the internal periphery of the conical cup $h^1$ which forms the complementary member of the clutch, and the return movement of the key will withdraw the nut out of engagement with the cup. Sliding the key $d$ from the position illustrated to the right will similarly, through the coaction of the oblique portion $e^2$ with the corresponding keyway in the nut $c^2$, engage the nut $c^2$ with its cup $h^2$.

The oblique portions $e^1$, $e^2$ of the keys are a loose fit in the keyways $f$ in the nuts $c^1$, $c^2$, so that normally they allow the necessary slight movement of the nuts on the threads $b^1$, $b^2$ to effect the automatic engagement and disengagement of the nuts with their cups due to the driven member overrunning or lagging behind the driving member. In practice, the oblique portion $e^1$ or $e^2$ of the sliding key is entered into the nut $c^1$ or $c^2$ until it turns the nut about its thread $b^1$ or $b^2$ and brings the friction surfaces of the nut and cup into contact. In this position, the clutch will free-wheel when the shaft $a$ overruns the cup $h^1$ or $h^2$ due to the loose fit of the key portion $e^1$ or $e^2$ in the keyway $f$, and said key portion functions as a stop to prevent the nut losing touch with its cup, which touch provides the necessary drag for smooth re-engagement of the clutch when the shaft lags behind the cup.

On the drive being taken up, the nut becomes firmly engaged in the cup owing to the proportional drive effect, and, if the key portion $e^1$ or $e^2$ be then slidden forward, the clutch is locked against disengagement and the oblique key portion becomes a wedge which prevents the nut $c^1$ or $c^2$ turning on its thread $b^1$ or $b^2$. If the key $d$ is slidden in the reverse direction, the nut $c^1$ or $c^2$ is moved back along its thread $b^1$ or $b^2$ and held out of engagement with its cup $h^1$ or $h^2$, the clutch then being locked in its disengaged position.

Instead of each key being double-ended as shown so that a continuation of the action of withdrawing one nut from its cup engages the other nut with its cup and vice versa, the keys may operate a single nut or three or more nuts may be operated by a single key or set of keys.

The key or keys may be slidden by means operating through the shaft $a$ which may be made hollow for this purpose, or they may be attached to a suitable collar or the like free to slide on the shaft $a$.

Fig. 4 illustrates the application of clutches in accordance with my invention to the gear box of an automobile wherein $j$ is the driving shaft, $k$ the pinion thereon which meshes with a pinion $m$ on the lay shaft $n$. $o$ is a pinion splined on the lay shaft meshing with a pinion $p$ keyed on the driven shaft $q$, and $r$ is a second pinion free on the lay shaft meshing with a pinion $s$ keyed on the boss of the pinion $p$. $t$ is a third pinion splined on the lay shaft meshing with a pinion $u$ free on the driven shaft. $b^1$, $b^2$, $b^3$ are threads on the shafts $q$ and $n$, and $c^1$, $c^2$, $c^3$ are conical nuts on said threads coacting with cups $h^1$, $h^2$, $h^3$ attached respectively to the driving pinion $k$, the pinion $u$ and the pinion $r$. $e^1$ and $e^2$ are the projecting oblique portions of the sliding key $d$ controlling the nuts $c^1$, $c^2$, and $e^3$ is the projecting oblique portion of the key $d^1$ controlling the nut $c^3$ whereby the clutches $c^1$, $h^1$, $c^2$, $h^2$ and $c^3$, $h^3$ respectively can be put into and out of operation as required.

In the first gear, the drive from the driving shaft $j$ is transmitted through the pinions $k$, $m$, the lay shaft $n$ and the pinions $o$, $p$ to the driven shaft $q$. To change to second gear, the pinion $o$ is slidden by the usual means to the left to disengage it from the pinion $p$ and the clutch $c^3$, $h^3$ is engaged by sliding the oblique key portion $e^3$ to the left thereby coupling the pinion $r$ to the lay shaft, the drive being transmitted through the pinions $r$, $s$ to the driven shaft $q$. To change to third gear, the clutch $c^3$, $h^3$ is disengaged by sliding the key portion $e^3$ to the right and the clutch $c^2$, $h^2$ engaged by sliding the key portion $e^2$ to the right thereby coupling the pinion $u$ to the shaft $q$, the drive being transmitted thereto through the pinion $t$ keyed on the lay shaft. To change to top gear, the clutch $c^2$, $h^2$ is disengaged by sliding the key portion $e^2$ to the left and the clutch $c^1$, $h^1$ engaged by sliding the key portion $e^1$ further to the left thereby coupling the pinion $k$ directly to the driven shaft $q$. The keys $d$ and $d^1$ carrying the oblique key portions $e^1$, $e^2$, $e^3$ are slidden through grooved collars $v$, $v^1$ on the shafts $q$ and $n$ engaged by forks $w$ on the usual operating rods $x$. The rods $x$ are slidden by the usual change-gear lever guided by the usual gate and operated through the mechanism indicated at $y$.

The energy required to lock or unlock the clutches is negligible owing to the proportional drive. This renders the device highly suitable for automobile control, as, when used in the gear-box of an automobile, the action of changing gear through a selector lever may only compress a spring such as the spring $z$ on the operating rod $x$, the change being subsequently effected when desired by relieving the load on the nut or its key either by withdrawing the standard clutch or closing the throttle of the car, thus enabling the spring to effect the change selected. The keys may be controlled directly by means of the usual selector gear forks and collars, and, the gear wheels being in constant mesh and the clutches working in oil, a perfect change can be effected by withdrawing the nut of one clutch and engaging that of another.

What I claim and desire to secure by Letters Patent is:—

1. The combination with an automatic friction clutch comprising a shaft, a threaded portion thereon, a nut engaging said threaded portion and a member with which said nut frictionally co-operates, of control means comprising a movable key interposed between said shaft and said nut, a projecting portion on said key and a keyway in said nut engaged by said projecting key portion.

2. The combination with an automatic friction clutch comprising a shaft, a threaded portion thereon, a nut engaging said threaded portion and a member with which said nut frictionally co-operates, of control means comprising an axially sliding key interposed between said shaft and said nut, an oblique projecting portion on said key and an inclined keyway in said nut engaged by said oblique projecting key portion.

3. The combination with an automatic friction clutch comprising a shaft, a threaded portion thereon, a nut engaging said threaded portion and a member with which said nut frictionally co-operates, of control means comprising an axially sliding key interposed between said shaft and said nut, an oblique projecting portion on said nut at right-angles to the thread on the shaft and an inclined keyway in said nut engaged by said oblique projecting key portion.

In testimony whereof, I affix my signature.

ARTHUR BOLTON.